United States Patent [19]

Sklebitz et al.

[11] Patent Number: 4,769,701
[45] Date of Patent: Sep. 6, 1988

[54] STEREO X-RAY INSTALLATION

[75] Inventors: Hartmut Sklebitz; Gerhard Hahm, both of Erlangen, Fed. Rep. of Germany

[73] Assignee: Siemens Aktiengesellschaft, Berlin and Munich, Fed. Rep. of Germany

[21] Appl. No.: 63,963

[22] Filed: Jun. 19, 1987

[30] Foreign Application Priority Data

Jul. 9, 1986 [DE] Fed. Rep. of Germany ....... 3623053

[51] Int. Cl.$^4$ ............................................. H04N 5/32
[52] U.S. Cl. ..................... 358/111; 378/99; 378/41; 378/57
[58] Field of Search ............... 378/41, 99, 57; 358/111

[56] References Cited

U.S. PATENT DOCUMENTS

| 3,808,444 | 4/1974 | Schneeberger et al. | 378/57 |
|---|---|---|---|
| 4,031,545 | 6/1977 | Stein et al. | 378/57 |
| 4,039,829 | 8/1977 | Kato et al. | 250/306 |
| 4,135,089 | 1/1979 | mcIntyre | 378/41 |
| 4,163,991 | 8/1979 | Burrig | 358/111 |
| 4,193,089 | 3/1980 | Brougham et al. | 358/111 |
| 4,346,717 | 8/1982 | Haerten | 128/660 |
| 4,468,696 | 8/1984 | Stone | 358/111 |
| 4,468,698 | 8/1984 | Kavonssi et al. | 378/99 |
| 4,485,815 | 12/1984 | Amplatz et al. | 128/329 R |
| 4,496,985 | 1/1985 | Jensen et al. | 358/111 |
| 4,652,918 | 3/1987 | Lin et al. | 378/99 |

FOREIGN PATENT DOCUMENTS 0129910 1/1985 European Pat. Off. .
3006749 4/1981 Fed. Rep. of Germany .

Primary Examiner—Craig E. Church
Assistant Examiner—John C. Freeman
Attorney, Agent, or Firm—Hill, Van Santen, Steadman & Simpson

[57] ABSTRACT

An x-ray apparatus for generating an image of an examination subject, including an image pattern of an instrument, for the purpose of guiding the instrument, includes dual x-ray sources and a stereo viewer for generating a stereo image of the examination subject from a video signal produced by attenuation of the x-rays by the patient and the instrument, a detector which identifies the presence of the instrument in the video signal and generates an output signal upon detection thereof, a phase-locked loop circuit for generating an image pattern of the instrument from the output of the detector, a mixer which combines the image pattern with the video signal, and a switching stage connected between the output of the phase-locked loop circuit and the mixer, the switching stage having a control input supplied with the output signal from the detector such that the image pattern of the instrument is supplied to the mixer in the absence of an output signal from the detector.

15 Claims, 1 Drawing Sheet

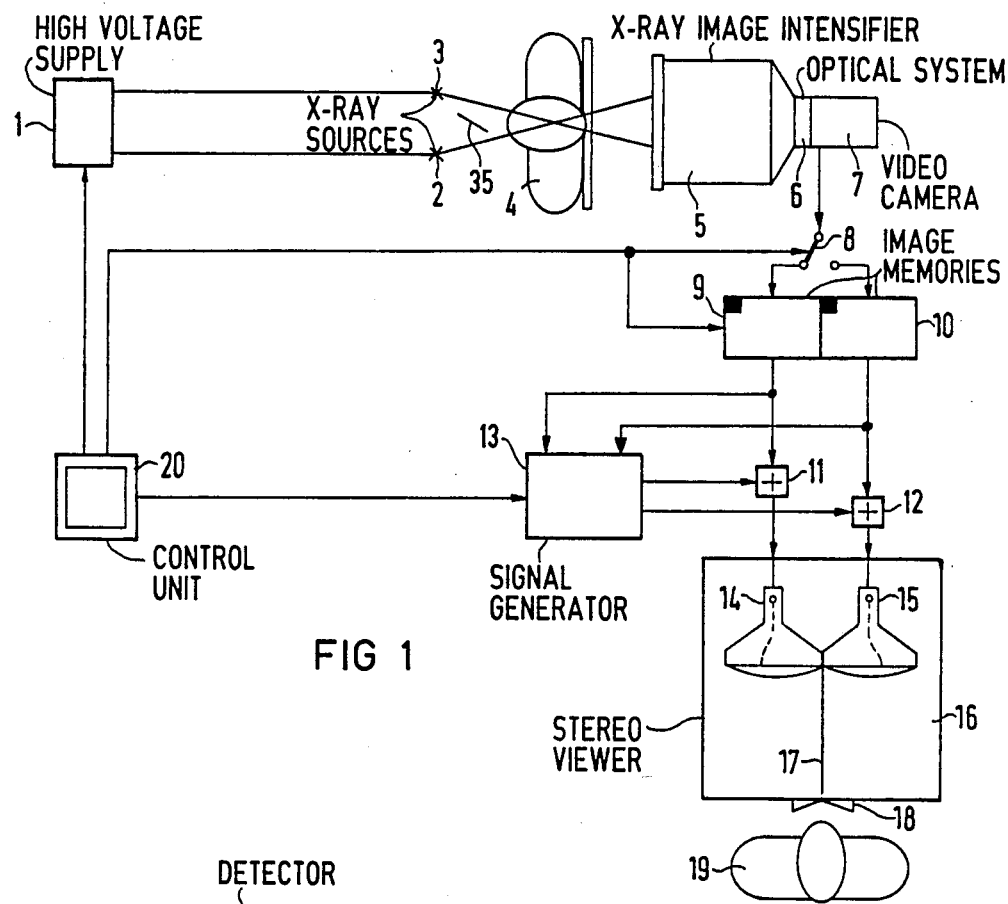
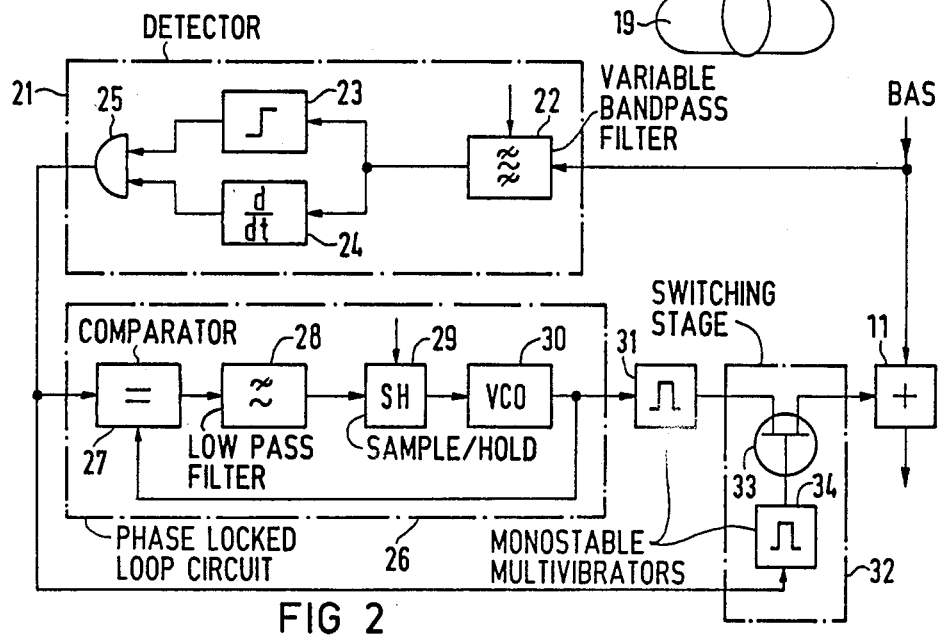

STEREO X-RAY INSTALLATION

BACKGROUND OF THE INVENTION

1. Field of the Invention

The present invention is directed to a stereo x-ray installation, and in particular to a stereo x-ray installation including means permitting guiding of a radiation-opaque instrument with respect to an examination subject.

2. Description of the Prior Art

Stereo x-ray installations are known which in general include two spaced x-ray sources having respective central rays intersecting in an exposure plane in an examination subject, an x-ray image intensifier video chain including an x-ray image intensifier having an input luminescent screen on which the image is generated by the two x-ray sources appear in chronological succession, a video camera for recording the output images from the image intensifier and generating video signals therefrom, and storage means connected to the video camera for storing the video signals of the stereo images for reproduction through a stereo viewer. Additional stages are sometimes disposed between the storage means and the stereo viewer which permit position-variable signals, generated by a signal generator, to be superimposed on the output signal of the storage means. Such stereo x-ray installations are used to generate three-dimensional x-ray images in transillumination.

One such stereo x-ray installation is disclosed in U.S. Pat. No. 4,485,815 which is used to supervise percutaneous puncture of an examination subject. The instrument used for the percutaneous puncture is a ruler-like carrier having a centrally disposed needle or catheter. To avoid direct x-ray irradiation of the hands of the surgeon, the carrier has a handle permitting it to be grasped outside of the radiation field. The needle or catheter is aligned to point in the direction of propagation of the x-rays. Although the direction of the needle incision can be seen, a precise alignment of the paracentesis channel is only possible by pivoting the x-ray diagnostics installation. The paracentesis depth, however, cannot be ascertained.

An x-ray installation permitting more precise identification of the three-dimensional arrangement of the patient and instrument is disclosed in German OS No. 30 06 749. In this stereo x-ray installation a television picture is reproduced with the two x-ray sources being controlled such that the two exposures which form a stereo image pair are generated with a slight time difference. The exposures are read in a known manner by a television camera, and are intermediately stored in respective image memories. Subsequently the stored image pair is reproduced on two picture tubes, having respective images separately supplied to each eye of an observer. A disadvantage of this apparatus is that the surgeon is not always in a position to recognize the resulting paracentesis channel with the required precision merely from the visual impression of the needle placed on the skin, because this is only partially visible at the edge of the stereo image.

German OS No. 29 36 259, corresponding to U.S. Pat. No. 4,346,717, discloses an installation for catheterization of organs wherein a guide mechanism for a needle is attached to an ultrasound device. The connection between the needle and the ultrasound device is such that a guide beam identifying the paracentesis direction is mixed with the ultrasound image dependent on the image of the guide channel. Again, however, a precise identification of the incision location is not possible because the representation is only two-dimensional. Moreover, the surgeon does not have complete freedom of movement during the procedure. The surgeon must hold the ultrasound array to which the guide is attached, and must then introduce the needle into the guide, after alignment of the needle, must introduce the needle into the patient. As with the aforementioned devices, a precise identification of the paracentesis depth is not possible.

SUMMARY OF THE INVENTION

It is an object of the present invention to provide a stereo x-ray installation of the type described above which permits precise guidance of an instrument, such as a needle or catheter, without burdening the surgeon or operator with apparatus other than the needle.

The above object is achieved in accordance with the principles of the present invention in a stereo x-ray apparatus wherein the video signal is supplied to a signal generator which includes a detector for image patterns contained in the video signal. A phase-locked loop circuit, also contained within the signal generator and connected to the output of the detector, generates a signal corresponding to the image pattern. This signal is mixed into the stereo image under the control of a switching stage. The switching stage has a control input connected to the output of the detector and permits the image pattern signal from the phase-locked loop circuit to be supplied to the mixer only in the absence of an image pattern. The apparatus thus generates a three-dimensionally oriented guide ray which is mixed with the stereo image having the appearance of, for example, a needle or catheter. The guide ray identifies the planned path of the needle. As a result of the three-dimensional observation, the required penetration depth can also be identified, for example under visual supervision.

The image content which is irrelevant for identification of the position of the instrument can be substantially eliminated by the use of a bandpass filter within the detector. The bandpass filter separates the signal of the image pattern from the video signal. Different needle diameters, magnification conditions and imaging angles can be taken into consideration by adjustment of the bandpass filter. A simple detector circuit includes a threshold circuit and a differentiating element connected to the output of the bandpass filter. The outputs of the threshold circuit and the differentiating element are combined in an AND element. A simple recognition of the end of the image pattern is achieved by the use of a monostable multivibrator in the switching stage having an input connected to the output of the detector. The stereo x-ray installation can be used to advantage in treatments requiring the percutaneous insertion of an instrument wherein the image pattern is the image of a needle and an identifying guide ray is mixed with the stereo image in the direction of penetration of the needle.

DESCRIPTION OF THE DRAWINGS

FIG. 1 is a block circuit diagram of a stereo x-ray installation constructed in accordance with the principles of the present invention.

FIG. 2 is a block circuit diagram of the signal generator of the installation of FIG. 1.

DESCRIPTION OF THE PREFERRED EMBODIMENTS

A stereo x-ray installation constructed in accordance with the principles of the present invention is shown in FIG. 1. The installation includes a high voltage supply 1 which supplies two symbolically illustrated x-ray sources 2 and 3. The x-ray sources 2 and 3 may be separate x-ray tubes, or a single stereo x-ray tube having separate foci disposed at a distance from each other. The x-rays from the sources 2 and 3 penetrate an exposure subject 4 and an instrument schematically indicated at 35. The attenuated x-rays generate a radiation image on the input luminescent screen of an x-ray image intensifier 5. This radiation image is picked-up from the output luminescent screen of the x-ray image intensifier 5 by a video camera 7 through a suitable optical system 6. The video signal from the video camera 7 is supplied to a switch 8, which alternatingly supplies the video signals to two image memories 9 and 10.

Signals generated by a signal generator 13 (described in detail in connection with FIG. 2) are superimposed on the output signals of the memories 9 and 10 by two mixers 11 and 12, which may be adders. The sum signals are supplied to two pictures tubes 14 and 15 in a stereo viewer 16. The two picture tubes 14 and 15 may, for example, be separated by a partition 17, and can be observed by a viewer 19 through openings 18, whereby each image on the picture tubes 14 and 15 is separately supplied to one of the eyes of the observer 19. A control unit 20 controls the operation of all components, and synchronizes the video signals. Operation of the stereo x-ray installation of FIG. 1 is as follows. Under the control of the control unit 20, the high voltage supply 1 first energizes the x-ray source 2, which emits a radiation beam in the direction toward the exposure subject 4. This first partial image is picked-up by the video camera 7, and the resulting video signal is entered in the memory 9. After this storage has been completed, the switch 8 is switched and the x-ray source 3 is energized. The x-ray source 3 emits a radiation beam which also penetrates the exposure subject 4, and generates another radiation image on the input luminescent screen of the x-ray image intensifier 5. The video signal from the video camera 7 corresponding to the second partial image is entered in the memory 10. When the second partial image has been stored, the exposure event is concluded. The video signals supplied to the stereo viewer 16 generate two images which appear to the observer 19 as a three-dimensional image as a result of the three-dimensional offset of the x-ray sources 2 and 3.

Circuitry for the signal generator 13 for one stereo channel is shown in detail in FIG. 2. The same circuitry is provided for the other stereo channel. The video signal BAS from one of the memories, for example the image memory 9, is supplied to a detector 21 which includes a frequency-variable bandpass filter 22 as an input stage. The detector 21 also includes a threshold circuit 23 and a differentiating element 24 to which the output of the filter 22 is supplied. The outputs of the threshold circuit 23 and the differentiating element 24 are supplied to two inputs of an AND element 25.

A phase-locked loop circuit 26 is connected to the output of the AND element 25 of the detector 21. The phase-locked loop circuit 26 includes a phase comparator 27 as an input stage, connected to a low pass filter 28. The output signal of the low pass filter 28 is supplied to an oscillator 30, for example a voltage controlled oscillator, through a sample and hold circuit 29. The output signal of the oscillator 30 is fed back to the phase comparator 27, which compares the phase of the output signal of the AND element 25 to that of the output signal of the oscillator 30.

The output of the oscillator 30 (which is the output of the phase locked loop circuit 26) is also supplied to a switching stage 32 through a first monostable multivibrator 31. The switching stage conducts the output of the phase-locked loop circit 26 to one of the mixers, such as the mixer 11, under the control of a transistor 33, for example a field effect transistor. The output signal of the phase-locked loop circuit 26 is thus superimposed in the mixer 11 with the video signal BAS for representation on the stereo viewer 16. The transistor 33 is driven by a second monostable multivibrator 34, to which the output signal from the AND element 25 is supplied.

The frequency range within which the electrical frequency spectrum representing imaging of the instrument in the video image lies can be identified from the instrument diameter, the existing magnification conditions, and the maximum angle of the image of the instrument relative to a vertical axis. The bandpass filter 22 is set to this frequency spectrum. The bandpass filter 22 thus substantially eliminates image content irrelevant to the identification of the position of the instrument, so that after passing through the bandpass filter 22, the video signal only contains the signal of the instrument. For identifying a center line of the imaged instrument, the output signal of the bandpass filter 22 is supplied to the threshold circuit 23, which is set such that a high signal is generated only given the presence of a sufficiently strong signal. At the same time, the output signal of the bandpass filter 22 is supplied to the differentiating element 24, which generates a high signal when the first differential of the input signal is zero. When both high signals are present at the inputs of the AND element 25, a high signal is supplied to the phase-locked loop circuit 26.

In the phase comparatorr 27 of the phase-locked loop circuit 26, the output signal of the AND element 25 is compared to the output signal of the oscillator 30, matched to the horizontal (scan) frequency of the video signal. The output signal of the phase comparator 27 is supplied through the low pass filter 28 to the oscillator 30, whose frequency and phase are set by means of this circuit. In this manner, the frequency and phase relation of the output voltage of the oscillator 30 are matched precisely to the required curve prescribed by the instrument.

Because the instrument signal was acquired from an x-ray video image, the signal contains x-ray quantum noise. A non-linear curve of the instrument would thus result. By appropriate dimensioning of the low pass filter 28, however, the disturbing influence of the quantum noise can be eliminated. The phase-locked loop circuit 26 thus functions as a "flywheel" synchronization means, wherein the deviation relative to the rated position is cancelled in the positive and negative directions.

In order for the phase-locked loop circuit 26 to undertake a complete matching of phase and frequency within a short time, the position of the instrument at the beginning of the image can be separately stored to permit the phase-locked loop circuit 26 to respond to the desired value during the vertical blanking interval.

After the scanning beam, which moves from top to bottom in the vertical direction, has passed the tip of the instrument, the drive voltage for the oscillator 30 is maintained constant by the sample and hold circuit 29, so that the control function of the circuit 26 is interrupted. The oscillator 30 thus oscillates with the correct phase relation adapted to the instrument curve.

The monostable multivibrator 31 connected to the output of the oscillator 30 converts the AC voltage of the oscillator 30 into pulses having a defined duration, which effect a mixing of a thin guideline into the video image. Because the image of the instrument is generally darker than the remaining portion of the stereo image, mixing of the output signal of the first monostable multivibrator ensues as a white line following the instrument path. An astable multivibrator may be connected between the transistor 33 and the second monostable multivibrator 34, permitting the guideline to be shown as dotted or broken.

The monostable multivibrator 34 of the switching stage 32 recognizes whether the derived image pattern pulses from the AND element 25 are present. When these signals are absent over an adjustable time, for example 310% of the horizontal line duration (meaning that no instrument pulse could be identified over three lines), the transistor 33 is driven to a conducting state, so that the output signals from the first monostable multivibrator 31 are supplied to the mixer 11.

The output pulses from the second monostable multivibrator 34 may be supplied to the sample and hold circuit 29 for further control. When the second monostable multivibrator 34 recognizes the end of the instrument, the sample and hold circuit 29 would interrupt the control loop, and maintain the control voltage constant at its last value.

Although modifications and changes may be suggested by those skilled in the art it is the intention of the inventors to embody within the patent warranted hereon all changes and modifications as reasonably and properly come within the scope of their contribution to the art.

We claim as our invention:

1. A stereo x-ray apparatus for generating an image of an examination subject including an image pattern of a foreign object relative to said examination subject, said apparatus comprising:
    two spaced x-ray sources disposed for irradiating said examination subject and said foreign object;
    means for generating a video signal from radiation from said x-ray sources attenuated by said examination subject and said foreign object;
    first and second image memories;
    means for alternatingly energizing said x-ray sources and for correspondingly alternatingly controlling entry of video signals from said means for generating a video signal into said first and second image memories;
    means connected to said first and second image memories for detecting the presence of said foreign object in said video signals and generating an output signal when said foreign object is present;
    a phase-locked loop circuit to which said output signal of said means for detecting is supplied for generating an image pattern corresponding to said foreign object adapted for mixing with said video signals;
    means for mixing said image pattern with said video signals;
    a switching stage connected between said phase-locked loop circuit and said means for mixing to which the output of said phase-locked loop circuit and said output signal of said means for detecting are supplied, said switching stage conducting said image pattern to said means for mixing in the absence of an output signal from said means for detecting; and
    means connected to said means for mixing for generating a stereo image of said examination subject with said image pattern from the output of said means for mixing.

2. A stereo x-ray apparatus as claimed in claim 1, wherein said means for detecting includes a bandpass filter as an input stage, said bandpass filter being dimensioned for filtering signals corresponding to said foreign object out of said video signals, and said bandpass filter having an output.

3. A stereo x-ray apparatus as claimed in claim 2, wherein said bandpass filter includes means for adjusting said dimensions of said bandpass filter.

4. A stereo x-ray apparatus as claimed in claim 2, wherein said means for detecting further comprises:
    a threshold circuit having an input connected to the output of said bandpass filter, and said threshold circuit having an output;
    a differentiating element having an input connected to the output of said bandpass filter, and said differentiating element having an output; and
    an AND element having respective inputs connected to the outputs of said threshold circuit and said differentiating element.

5. A stereo x-ray apparatus as claimed in claim 1, wherein said switching stage includes a monostable multivibrator having an input to which said output signal of said means for detecting is supplied.

6. A stereo x-ray apparatus as claimed in claim 1, wherein said foreign object is a needle to be inserted in said examination subject, and wherein said image pattern corresponds to the path of said needle within said examination subject.

7. An x-ray apparatus for generating an image of an examination subject including an image pattern of an instrument relative to said examination subject, said apparatus comprising:
    means for generating a radiation field in which said examination subject and said instrument are disposed;
    means for generating a video signal from radiation attenuated by said examination subject and said instrument;
    means for detecting the presence of said instrument in said video signal and generating an output signal upon detection thereof;
    said means for detecting connected to a means for generating an image pattern of said instrument from the output of said means for detecting;
    means for mixing said image pattern with said video signal;
    switching means connected between said means for generating an image pattern and said means for mixing, said switching means having a control input to which said output signal of said means for detecting is supplied, and said switching means conducting said image pattern to said means for mixing in the absence of an output signal from said means for detecting; and means connected to an output of said means for mixing for displaying said video signal mixed with said image pattern.

8. An x-ray apparatus as claimed in claim 7, wherein said means for generating a radiation field includes two radiation sources wherein said means for generating a video signal and said means for mixing said image pattern with said video signal each include separate channels for respective video signals obtained by irradiation of said examination subject and said instrument by each of said radiation sources and wherein said means for displaying said video signal mixed with said image pattern is a stereo viewer.

9. An x-ray apparatus as claimed in claim 7, wherein said means for generating an image pattern of said instrument from the output of said means for detecting has means for mixing with said video signal is a phase-locked loop circuit.

10. An x-ray apparatus as claimed in claim 7, further comprising a monostable multivibrator connected between said means for generating an image pattern and said switching means.

11. A stereo x-ray apparatus for generating an image of an examination subject including an image pattern of an instrument relative to said examination subject, said apparatus comprising:

means for generating and displaying a stereo x-ray image of said examination subject including two channels each generating a video signal corresponding to said examination subject and said instrument;

a signal generating means for generating an image pattern corresponding to said instrument having means for mixing said image pattern with each of said video signals, said signal generator including for each channel a detector to which one of said video signals is supplied, a phase-locked loop circuit connected to an output of said detector, a first monostable multivibrator connected to an output of said phase-locked loop circuit, and a switching stage having inputs respectively connected to an output of said first monostable multivibrator and the output of said detector, and wherein said switching stage has an output;

each channel also including means for mixing the output of said switching stage of said signal generator with one of said video signals;

said detector including in sequence a bandpass filter to which said one of said video signals is supplied, a threshold circuit and a differentiating element each having an input to which the output of said bandpass filter is supplied, and each having an output, and an AND gate having respective inputs to which the outputs of said threshold circuit and said differentiating element are supplied, the output of said AND element forming the output of said detector;

said phase-locked loop circuit comprising a comparator having a first input to which the output of said detector is supplied and an output and a second input, and an oscillator having an input connected to the output of said comparator and said oscillator having an output fed back to said second input of said comparator, the output of said oscillator forming the output of said phase-locked loop circuit and being supplied to said first monostable multivibrator; and said switching stage comprising a second monostable multivibrator having an input connected to said output of said detector and said second monostable multivibrator having an output, and a transistor having a control input connected to the output of said second monostable multivibrator and a conducting path connected between the output of said first monostable multivibrator and said means for mixing for one of said channels.

12. A stereo x-ray apparatus as claimed in claim 11, wherein said phase-locked loop circuit further includes a low pass filter connected between said comparator and said oscillator.

13. A stereo x-ray apparatus as claimed in claim 11, wherein said phase-locked loop circuit further includes a sample and hold circuit connected between said comparator and said oscillator.

14. A stereo x-ray apparatus as claimed in claim 11, wherein said oscillator is a voltage controlled oscillator.

15. A stereo x-ray apparatus as claimed in claim 11, wherein said bandpass filter includes means for varying the dimensions of said bandpass filter.

* * * * *